United States Patent
Sato

(10) Patent No.: US 6,604,274 B1
(45) Date of Patent: Aug. 12, 2003

(54) METHOD OF PRODUCING THIN FILM MAGNETIC HEAD

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 225 days.

(21) Appl. No.: 09/593,678

(22) Filed: Jun. 14, 2000

Related U.S. Application Data

(62) Division of application No. 09/207,543, filed on Dec. 8, 1998, now Pat. No. 6,301,075.

(30) Foreign Application Priority Data

Dec. 10, 1997 (JP) .............................. 9-340121

(51) Int. Cl.⁷ .............................. G11B 5/127; H04R 3/00
(52) U.S. Cl. .............................. 29/603.14; 29/603.13; 427/128; 360/126; 360/119
(58) Field of Search .............................. 29/603.13, 603.14; 427/128, 132; 360/126, 125, FOR 202, FOR 203, 119, 110

(56) References Cited

U.S. PATENT DOCUMENTS

| | | | |
|---|---|---|---|
| 4,516,180 A | | 5/1985 | Narishige et al. |
| 4,550,353 A | * | 10/1985 | Hirai et al. .................... 216/22 |
| 4,791,719 A | * | 12/1988 | Kobayashi et al. ........... 216/22 |
| 4,819,112 A | | 4/1989 | Iwata et al. |
| 4,949,209 A | | 8/1990 | Imanaka et al. |
| 5,032,945 A | | 7/1991 | Argyle et al. |
| 5,224,002 A | | 6/1993 | Nakashima et al. |
| 5,245,493 A | * | 9/1993 | Kawabe et al. ............. 360/122 |
| 5,313,356 A | | 5/1994 | Ohkubo et al. |
| 5,314,596 A | | 5/1994 | Shukovsky et al. |
| 5,331,728 A | | 7/1994 | Argyle et al. |
| 5,388,019 A | | 2/1995 | Argyle et al. |
| 5,750,275 A | | 5/1998 | Katz et al. |

FOREIGN PATENT DOCUMENTS

| | | |
|---|---|---|
| JP | 63-244407 | 10/1988 |
| JP | 63-247906 | 10/1988 |
| JP | 1-102712 | 4/1989 |

* cited by examiner

*Primary Examiner*—Richard Chang
(74) *Attorney, Agent, or Firm*—Brinks Hofer Gilson & Lione

(57) ABSTRACT

A method for fabricating a thin film magnetic head is disclosed. A nonmagnetic gap layer is formed on a lower gap layer. A first insulating layer is formed on a first part of the nonmagnetic gap layer. A second part of the nonmagnetic gap layer not covered with the first insulating layer is a magnetic gap formation section, which is part of a tip region. A coil layer and a second insulating layer are formed on the first insulating layer. A first underlying layer composed of a magnetic material extending from the nonmagnetic gap layer inside the tip region is formed over the second insulating layer. A first magnetic material layer is formed on the first underlying layer outside the tip region. The first underlying layer is removed from inside the tip region. A nonmagnetic material layer extending from the nonmagnetic gap layer is formed over the first magnetic layer.

4 Claims, 8 Drawing Sheets

METHOD OF PRODUCING THIN FILM MAGNETIC HEAD

The present application is a divisional application of application Ser. No. 09/207,543 filed on Dec. 8, 1998, now U.S. Pat. No. 6,301,075, which is hereby incorporated by reference.

BACKGROUND OF THE INVENTION

1. Field of the Invention

The present invention relates to an inductive type thin film magnetic head used for a floating type magnetic head or the like, and more particularly, to a thin film magnetic head which can reduce eddy current loss without forming a secondary magnetic gap by improving the structure of a core layer, and a method of fabricating such a thin film magnetic head.

2. Description of the Related Art

FIG. 7 is a longitudinal sectional view of a conventional thin film magnetic head.

The thin film magnetic head shown in FIG. 7 is a so-called "combined magnetic head", in which a reading head, using a magnetoresistance effect, and an inductive magnetic head, for writing the signal into a recording medium such as a hard disk, are deposited. The combined magnetic head is provided on the end of a slider of a floating type magnetic head on the trailing side facing a recording medium such as a hard disk.

As shown in FIG. 7, an underlying layer 41, a lower shield layer 42, a lower insulating layer 43, a magnetoresistive element layer 44, and an upper insulating layer 45 are sequentially deposited on a substrate 40 composed of $Al_2O_3$—TiC, and an inductive magnetic head for writing is formed thereon.

A lower core layer 20 is composed of a magnetic material having high magnetic permeability such as an Fe–Ni alloy (permalloy). In a combined magnetic head in which the inductive magnetic head shown in FIG. 7 is sequentially deposited on a reading head using a magnetoresistance effect, the lower core layer 20 functions also as an upper shield layer for the reading head.

A gap layer 2 composed of a nonmagnetic material such as $Al_2O_3$ (aluminum oxide) is formed on the lower core layer 20. An insulating layer 3 composed of a resist or other organic resin is formed on the gap layer 2.

A coil layer 4, composed of a conductive material having low electrical resistance such as Cu, is spirally formed on the insulating layer 3. Although the coil layer 4 is formed so as to go around a base 21b of an upper core layer 21, only a portion of the coil layer 4 is shown in FIG. 7.

An insulating layer 5 composed of a resist or other organic resin is formed on the coil layer 4. The upper core layer 21 is formed by plating a magnetic material such as a permalloy on the insulating layer 5. A tip 21a of the upper core layer 21 is joined to the lower core layer 20 with the gap layer 2 therebetween at the section facing a recording medium to form a magnetic gap having a gap length Gl1. Also, a gap depth Gd is determined by the depth of the tip 21a.

Also, the base 21b of the upper core layer 21 is connected to the lower core layer 20 through a hole formed in the gap layer 2 and the insulating layer 3.

In the inductive magnetic head for writing, when a recording current is applied to the coil layer 4, a recording magnetic field is induced to the lower core layer 20 and upper core layer 21, and a magnetic signal is recorded onto a recording medium such as a hard disk by means of a leakage magnetic field from the magnetic gap between the lower core layer 20 and the tip 21a of the upper core layer 21.

Although the recording frequency must be increased in order to meet the high-density recording, if the resistivity in the lower core layer 20 and the upper core layer 21 is low, eddy-current heat loss increases at high frequencies.

Therefore, the resistivity in the lower core layer 20 and the upper core layer 21 must be increased, and one of the known methods for increasing the resistivity is to change the structure of the lower and upper core layers 20 and 21 from a single layer to a laminate.

In accordance with Japanese Patent Laid-Open Nos. 63-244407 and 1-102712, as shown in FIG. 8, an upper core layer 21 (and/or a lower core layer 20) is formed of a laminate in which a nonmagnetic material layer 24 is interposed between magnetic material layers 22 and 23.

In such a laminate, eddy current loss can be reduced.

However, as shown in FIG. 8, the nonmagnetic material layer 24 is revealed to the surface (air bearing surface) facing a recording medium D, and magnetic gaps (secondary magnetic gaps) having a gap length Gl2 are formed by nonmagnetic material layers 24.

Accordingly, in the thin film magnetic head shown in FIG. 8, in addition to a magnetic gap having a gap length Gl1 by a gap layer 2, the magnetic gaps by the nonmagnetic material layer 24 (hereinafter referred to as "secondary magnetic gaps") are formed, resulting in unstable recording characteristics.

In particular, if a secondary magnetic gap is formed on the upper core layer 21, the secondary magnetic gap is located on the trailing side in relation to the original magnetic gap toward the recording medium D, and since the secondary magnetic gap is scanned after the original magnetic gap is scanned toward the recording medium D, the leakage magnetic field from the secondary magnetic gap largely affects the recording medium D.

Japanese Patent Laid-Open No. 63-247906 discloses a thin film magnetic head in which the structure of the tip of a core layer has been improved so as not to form a secondary magnetic gap in the core layer.

In the thin film magnetic head disclosed in the patent described above, as shown in FIG. 9, a nonmagnetic material layer 24 is formed in regions other than a region near a tip 21a of an upper core layer 21, and the nonmagnetic material layer 24 is not exposed at the surface facing a recording medium D.

By employing such a structure, no trouble is caused by secondary magnetic gaps, and because of the laminate in the regions other than the tip 21l, there is low eddy-current heat loss, enabling an improvement in recording characteristics at high frequencies.

However, since the nonmagnetic material layer 24 is not formed near the tip 21a of the upper core layer 21, the region near the tip 21a is single-layered, which increases eddy current loss near the tip 21a. Also, the fabrication process becomes significantly complex.

SUMMARY OF THE INVENTION

The present invention has been achieved in order to overcome the difficulties noted above with respect to the conventional art. It is an object of the present invention to provide a thin film magnetic head that does not cause a secondary magnetic gap and that can reduce eddy current loss by forming a core layer into a laminate having a-nonmagnetic material layer interposed between magnetic material layers, and, in particular, by improving the structure of the tip of the core layer.

In accordance with the present invention, a thin film magnetic head includes first and second core layers composed of a magnetic material, and a coil layer provided between the core layers for inducing a recording magnetic field to both core layers. At least one of the core layers is a laminate in which a nonmagnetic material layer is interposed between magnetic material layers, the nonmagnetic material layer is exposed between the first and second core layers at the surface facing a recording medium, and a magnetic gap is formed by the nonmagnetic material layer.

Preferably, a core layer on the trailing side is a laminate.

The nonmagnetic material layer may be formed by oxidizing a nonmagnetic metal layer.

Also, in accordance with the present invention, in a method of fabricating a thin film magnetic head, the head including first and second core layers composed of a magnetic material, a gap layer composed of a nonmagnetic material provided between the core layers, a coil layer for inducing a recording magnetic field to both core layers and an insulating layer for covering the coil layer, the method includes the steps of:

after forming the gap layer on the lower core layer and forming the coil layer and the insulating layer on the gap layer, forming a magnetic underlying layer to extend from the gap layer to the insulating layer;

forming a first magnetic material layer on the underlying layer excluding a tip region that includes a magnetic gap formation section;

removing the underlying layer in the tip region, and forming a nonmagnetic material layer to extend from the gap layer in the tip region without the underlying layer to the first magnetic material layer; and forming an underlying layer composed of a magnetic material on the nonmagnetic material layer, and further forming a second magnetic material layer on the underlying layer.

In accordance with the present invention, after forming the first magnetic material layer, a nonmagnetic metal layer may be formed to extend from the gap layer in the tip region to the first magnetic material layer, and a nonmagnetic material layer may be formed by anodizing the nonmagnetic metal layer.

Also, a magnetic gap may be formed by interposing the nonmagnetic material layer between the first magnetic-material layer and the second magnetic material layer in the tip region, instead of forming the gap layer between the lower core layer and the upper core layer.

In accordance with the present invention, the core layer takes the form of a laminate including the nonmagnetic material layer interposed between the first and second magnetic material layers, and thus no secondary magnetic gap is formed, enabling a reduction in eddy current loss.

As illustrated in FIGS. 1 to 4, an upper core layer 6 in the present invention takes the form of a laminate including a first magnetic material layer 7, a nonmagnetic material layer 8, and a second magnetic material layer 9, however, the first magnetic material layer 7 is not formed in the tip region, and the upper core layer 6 in the tip region is formed of the nonmagnetic material layer 8 and the second magnetic material layer 9.

The nonmagnetic material layer 8 is formed in contact with a gap layer 2 and is exposed at the surface facing a recording medium D, as illustrated in FIG. 1.

A magnetic gap having a gap length Gl is formed by the gap layer 2 and the nonmagnetic material layer 8, and the nonmagnetic material layer 8 does not function as a secondary magnetic gap as has been seen in conventional art.

In comparison with the conventional single-layered upper core layer 21 (refer to FIG. 7), the first magnetic material layer 7 and the second magnetic layer 9 are formed thinly, and also, the first magnetic material layer 7 and the second magnetic material layer 9 are electrically isolated from each other by the nonmagnetic material layer 8, and thus eddy current loss can be properly reduced.

Although, in the thin film magnetic head shown in FIG. 1, the upper core layer 6 only is formed as a laminate and the lower core layer 1 is single-layered, preferably the lower core layer 1 is also formed as a laminate similarly to the upper core 6.

In such a case, as shown in FIG. 2, preferably, a nonmagnetic material layer 8 included in the lower core layer 1 is formed in contact with the gap layer 2 in the tip region in a manner similar to that of the nonmagnetic material layer 8 included in the upper core layer 6 so that a secondary magnetic gap is not formed.

However, the lower core layer 1 which corresponds to a core on the leading side may be a laminate in which the first magnetic material layer 7, the nonmagnetic material layer 8, and the second magnetic material 9 are formed in parallel, that is, the nonmagnetic material layer 8 may not be formed in contact with the gap layer 2 in the tip region, as shown in FIG. 3.

With such a structure, although a secondary magnetic gap is formed by the nonmagnetic material layer 8 in the lower core layer 1, even if the secondary magnetic gap is formed in the lower core layer 1, recording characteristics are not greatly affected by this, because of the reason described below.

Since the lower core layer 1 lies on the leading side, as shown in FIG. 3, when the recording medium D drives in the direction shown by an arrow, the recording signal is written into the recording medium D first by the magnetic gap formed in the lower core layer 1.

However, the recording signal is erased by the leakage magnetic field from the magnetic gap having the gap length Gl, which is located on the trailing side, and only the recording signal from the correct magnetic gap continues to be written into the recording medium D.

Therefore, when the lower core layer 1 on the leading side is formed as a laminate including the nonmagnetic material layer 8 provided between the first magnetic material layer 7 and the second magnetic material layer 9, even if the nonmagnetic material layer 8 is not brought into contact with the gap layer 2 at the surface facing the recording medium, recording characteristics are not greatly affected.

On the contrary, if a secondary magnetic gap is formed in the upper core layer 6 which corresponds to a core on the trailing side, the recording signal written into the recording medium D by the leakage magnetic field from the correct magnetic gap is erased by the leakage magnetic field from a secondary magnetic gap formed in the upper core layer 6, and thus recording characteristics become unstable.

Therefore, with respect to the upper core layer 6 on the trailing side, the nonmagnetic material layer 8 in the tip region must be formed in contact with the gap layer 2 so that no secondary magnetic gap is formed by the nonmagnetic material layer 8.

As described above, in accordance with the present invention, at least one of first and second core layers is formed as a laminate including a nonmagnetic material layer provided between magnetic material layers, and also, the nonmagnetic material layer is formed such that the nonmagnetic material layer is exposed between the first and second core layers at the surface facing a recording medium, and thus no secondary magnetic gap is formed, enabling a reduction in eddy current loss.

DESCRIPTION OF THE PREFERRED EMBODIMENTS

Figure 1:
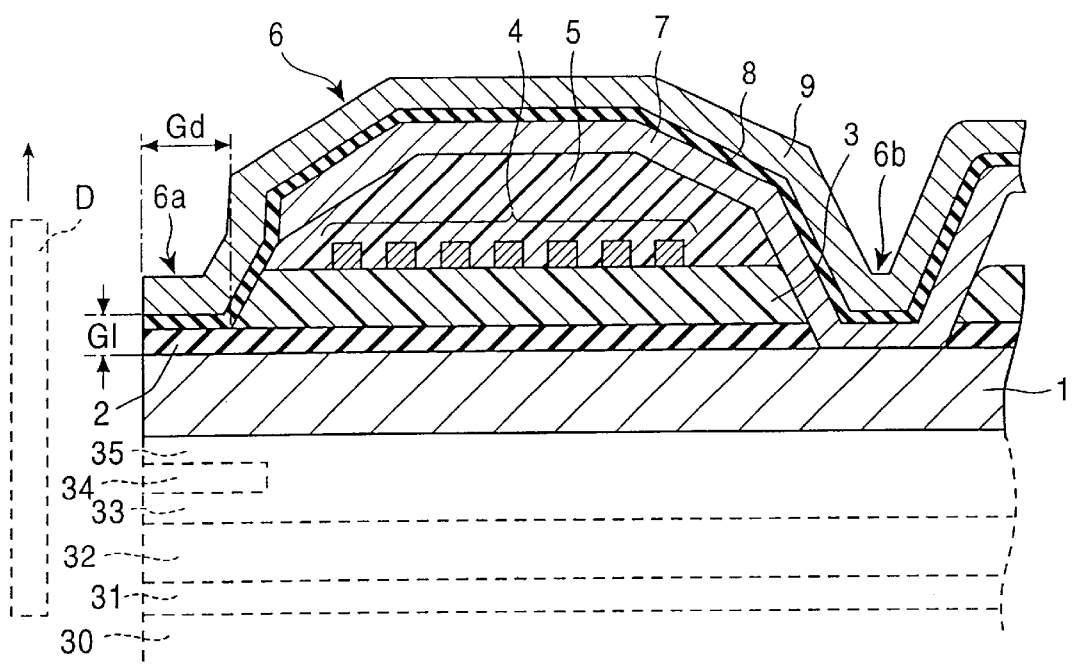
FIG. 1 is a longitudinal sectional view of a thin film magnetic head as a first embodiment of the present invention.
Figure 2:
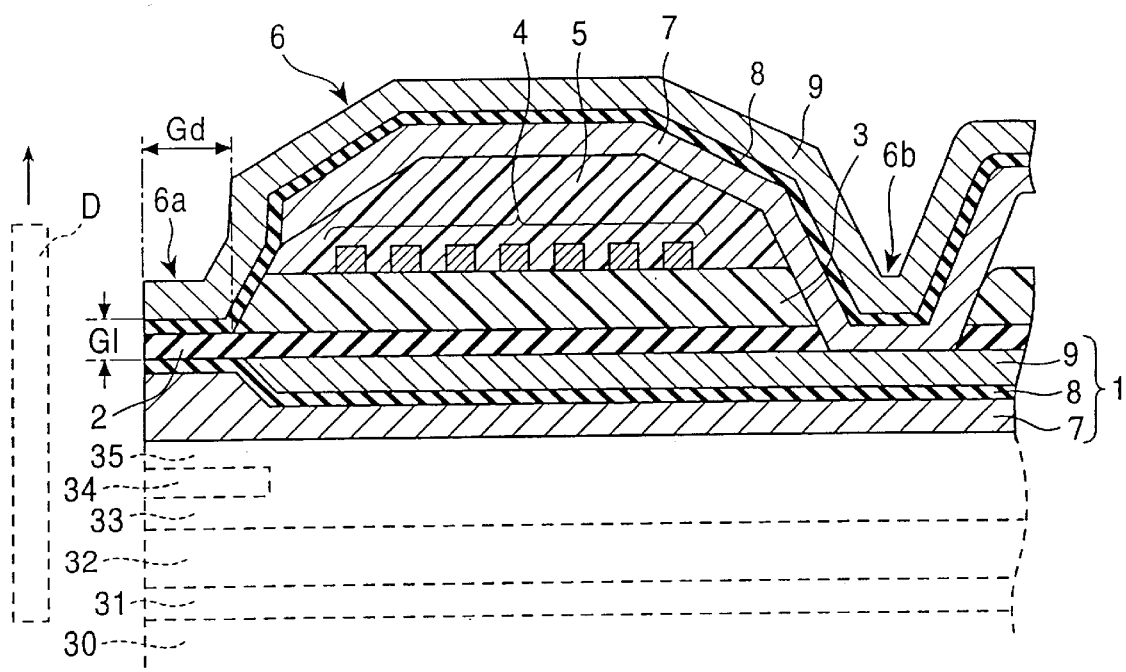
FIG. 2 is a longitudinal sectional view of a thin film magnetic head as a second embodiment of the present invention.
Figure 3:
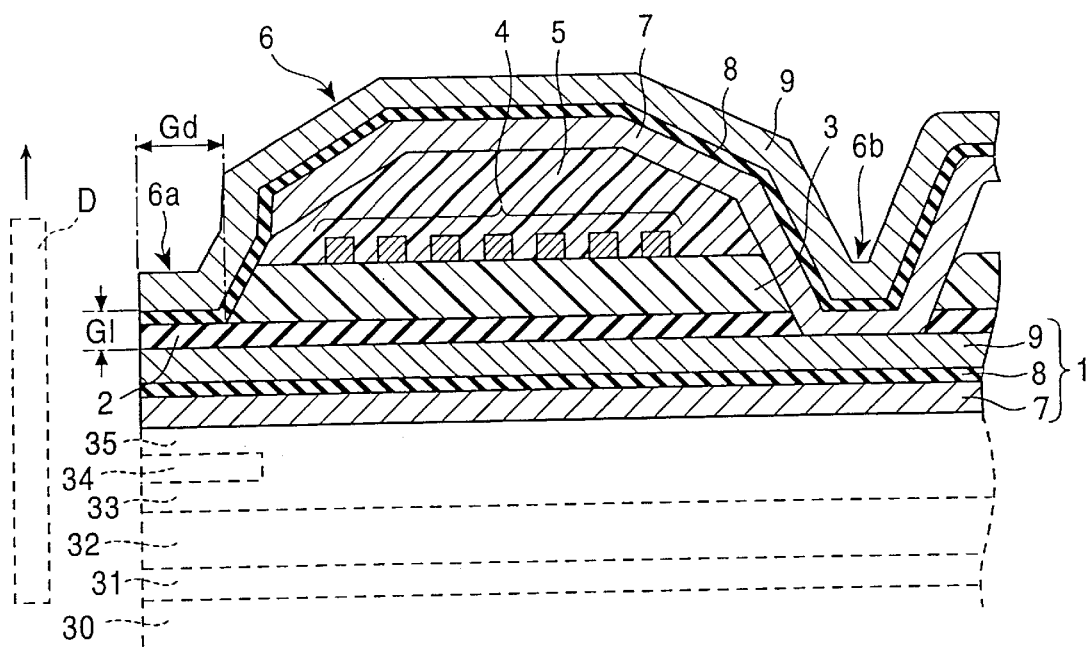
FIG. 3 is a longitudinal sectional view of a thin film magnetic head as a third embodiment of the present invention.
Figure 4:
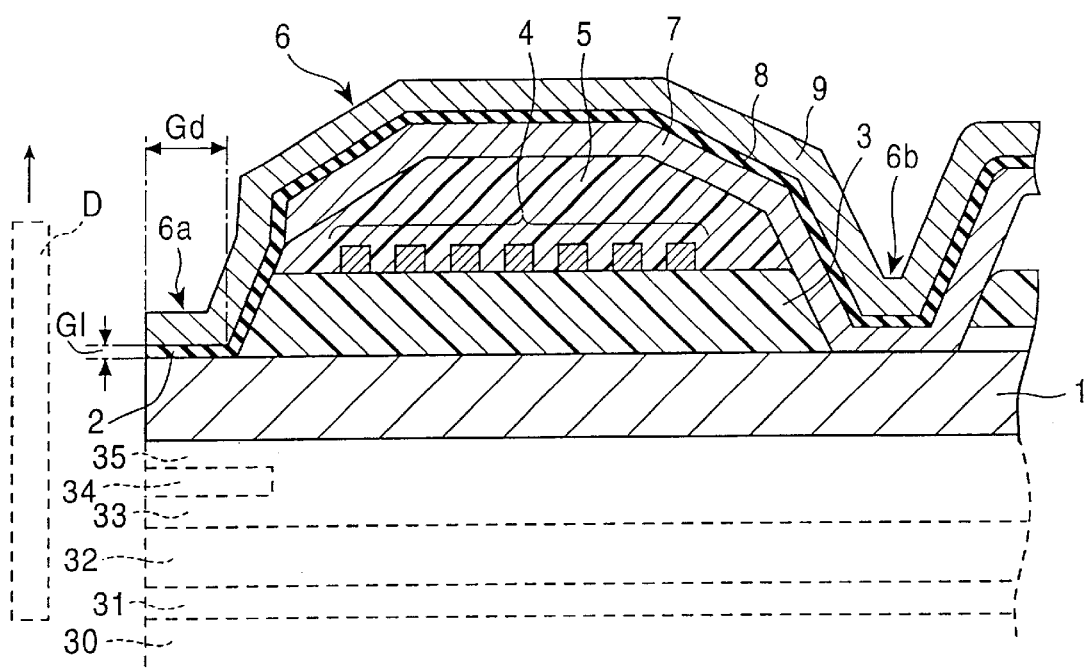
FIG. 4 is a longitudinal sectional view of a thin film magnetic head as a fourth embodiment of the present invention.

FIG. 1 is a longitudinal sectional view of a thin film magnetic head as a first embodiment of the present invention FIG. 2 is a longitudinal sectional view of a thin film magnetic head as a second embodiment of the present invention, FIG. 3 is a longitudinal sectional view of a thin film magnetic head as a third embodiment of the present invention, and FIG. 4 is a longitudinal sectional view of a thin film magnetic head as a fourth embodiment of the present invention.

The thin film magnetic heads shown in FIGS. 1 through 4 are so-called "combined magnetic heads", in which a reading head using a magnetoresistance effect and an inductive magnetic head for writing are deposited.

As shown in FIGS. 1 through 4, an underlying layer 31, a lower shield layer 32, a lower insulating layer 33, a magnetoresistive element layer 34, and an upper insulating layer 35 are sequentially deposited on a substrate 30 composed of $Al_2O_3$-TiC, and an inductive magnetic head for writing is formed thereon.

A lower core layer 1 is composed of a magnetic material such as a Ni-Fe alloy. The lower core layer 1 also functions as an upper shield layer for the reading head.

A gap layer 2 composed of an insulating material is formed on the lower core layer 1.

An insulating layer 3, composed of an organic resin material such as a resist material, is formed on the gap layer 2, and a coil layer 4, composed of a conductive material having low electrical resistance such as Cu, is spirally formed on the insulating layer 3. An insulating layer 5 composed of an organic resin material is further formed on the coil layer 4.

An upper core layer 6 composed of a magnetic material such as a permalloy is formed on the insulating layer 5.

A depth of a tip 6a of the upper core layer 6 corresponds to a gap depth Gd, as shown in FIG. 1.

Although not shown in the drawing, the width of the tip 6a at the surface facing a recording medium is narrower than that of the upper core layer 6 other than the tip 6a, and is substantially same as a track width Tw.

Also, a base 6b of the upper core layer 6 is magnetically connected to the lower core layer 1 through a hole formed in the gap layer 2 and the insulating layer 3.

In this inductive magnetic head, when a recording current is applied to the coil layer 4, a recording magnetic field is induced to the lower core layer 1 and the upper core layer 6, and a magnetic signal is recorded onto a recording medium such as a hard disk by means of a leakage magnetic field from the magnetic gap between the lower core layer 1 and the tip 6a of the upper core layer 6.

In the present invention, as shown in FIG. 1, the upper core layer 6 is a laminate in which a nonmagnetic material layer 8 is interposed between a first magnetic material layer 7 and a second magnetic material layer 9.

The first magnetic material layer 7 and the second magnetic material layer 9 are composed of a magnetic material such as a Ni-Fe alloy, and the nonmagnetic material layer 8 is composed of a nonmagnetic material such as $SiO_2$ or $A_2O_3$. Also, the nonmagnetic material layer 8 may be formed by anodizing a nonmagnetic metal layer composed of Al, Ta, Cr, or the like.

Figure 7:
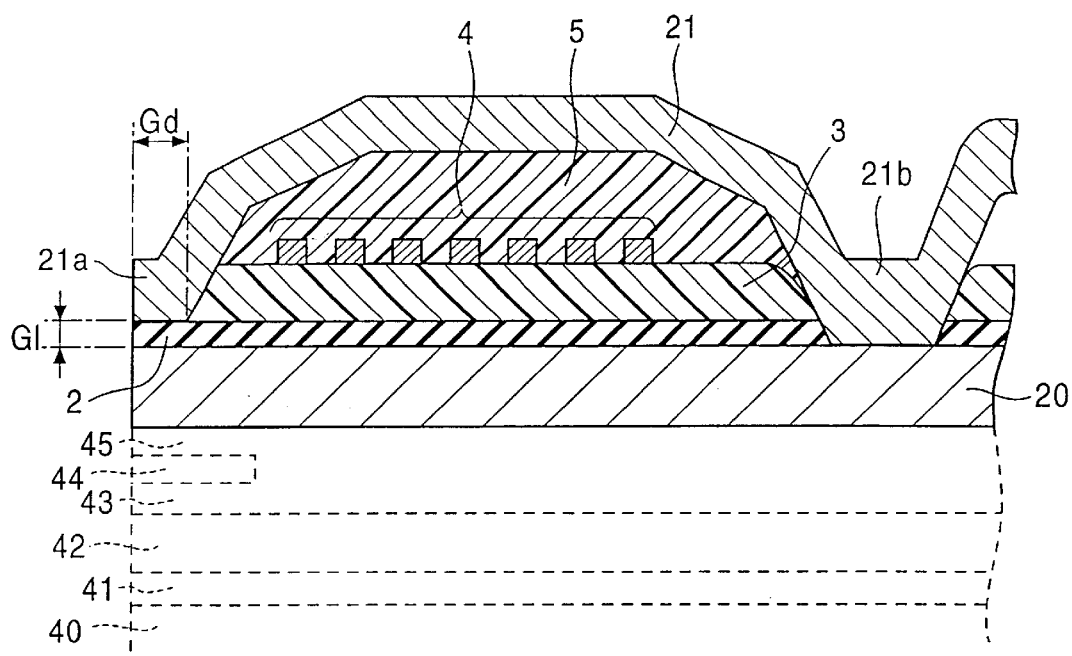
FIG. 7 is a longitudinal sectional view of a first conventional thin film magnetic head.

In the present invention, the total thickness of the first magnetic material layer 7 and the second magnetic material layer 9 is substantially same as the thickness of a conventional upper core layer (refer to the upper core layer 21 in FIG. 7). By interposing the nonmagnetic material layer 8 between the first magnetic material layer 7 and the second magnetic material layer 9, the magnetic material layers 7 and 9 are electrically isolated.

Accordingly, even if the recording frequency is increased in order to cope with the high-density recording, eddy current loss can be reduced.

In the present invention, the upper core layer 6 is formed by depositing the first magnetic material layer 7, the nonmagnetic material layer 8, and the second magnetic material layer 9, and additionally the tip region of the upper core layer 6 is improved, and thereby the problem related to secondary magnetic gaps is solved.

The first magnetic material layer 7 included in the upper core layer 6 is not formed near the tip 6a of the upper core layer 6 (hereinafter referred to as a "tip region"), and the first magnetic material layer 7 is not exposed at the surface facing the recording medium D.

Therefore, in the tip region, the upper core layer 6 is formed of two layers including the nonmagnetic material layer 8 and the second magnetic material layer 9, and the nonmagnetic material layer 8 is formed in contact with the gap layer 2 at a depth Gd.

The gap layer 2 and the nonmagnetic material layer 8 are exposed between the magnetic material layer 9 and the lower core layer 1 at the surface facing the recording medium D, and a magnetic gap having a gap length Gl is formed by the nonmagnetic material layer 8 and the gap layer 2.

Figure 8:
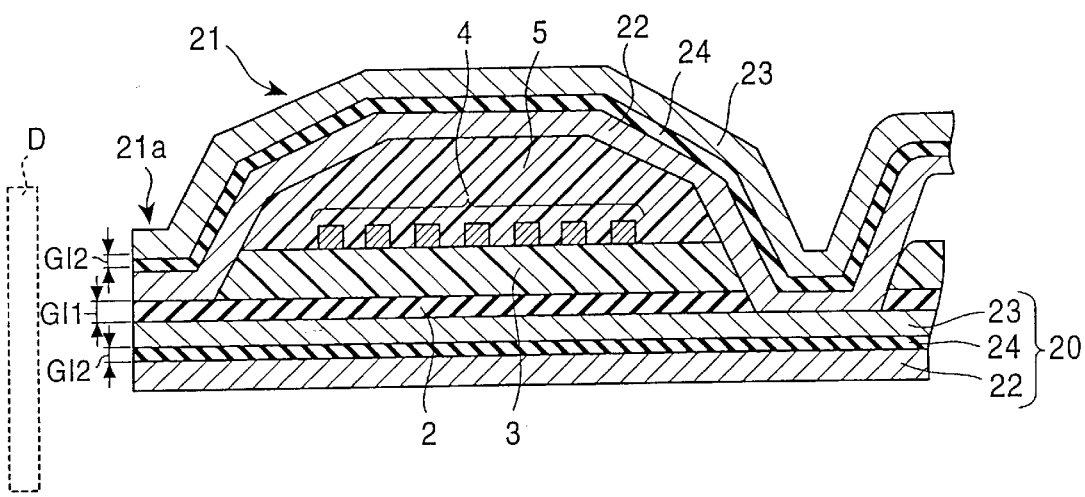
FIG. 8 is a longitudinal sectional view of a second conventional thin film magnetic head.
Figure 9:
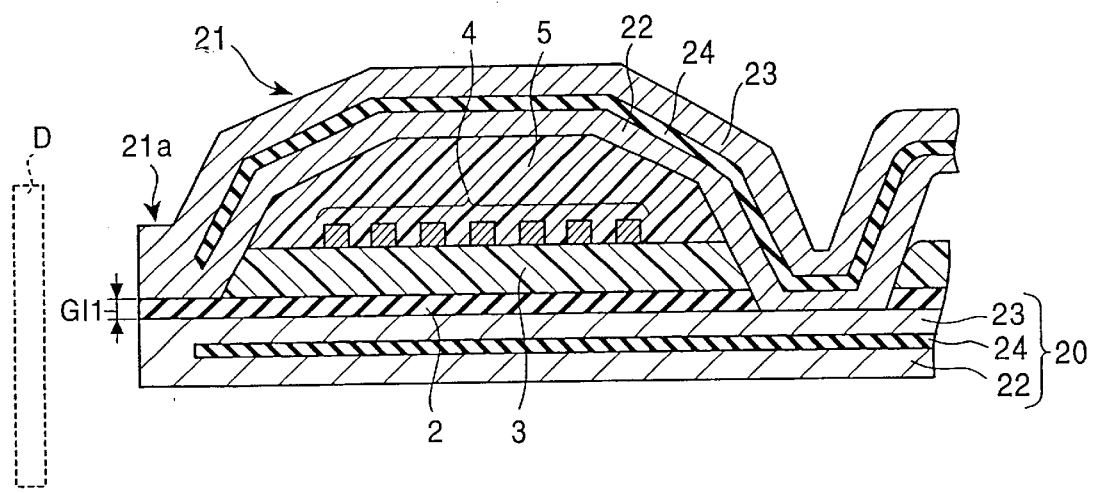
FIG. 9 is a longitudinal sectional view of a third conventional thin film magnetic head.

As described above, since the nonmagnetic material layer 8, along with the gap layer 2, is exposed at the surface facing the recording medium D, a secondary magnetic gap is not formed as in the conventional art (refer to FIG. 8), and thus stable recording characteristics can be obtained.

Although, in the thin film magnetic head shown in FIG. 1, the lower core layer 1 is single-layered, it may be formed of a laminate in which a nonmagnetic material layer is interposed between magnetic material layers similarly to the upper core layer 6.

In such a case, as shown in FIG. 2, it is particularly preferable that a nonmagnetic material layer 8 included in lower core layer 1 be formed in contact with a gap layer 2 in the tip region, and be exposed at the surface facing the recording medium along with the gap layer 2, because a secondary magnetic gap is not formed by the nonmagnetic material layer.

However, as shown in FIG. 3, even if a secondary magnetic gap by the nonmagnetic material layer 8 is formed in the lower core layer 1 that corresponds to a core layer on the leading side, recording characteristics are not greatly affected.

Since the lower core layer 1 is a core layer on the leading side, when a recording medium D shown in FIG. 3 drives in the direction shown by an arrow, the recording signal is written into the recording medium D first by the magnetic gap formed in the lower core layer 1.

However, the recording signal is erased by the leakage magnetic field from the magnetic gap having a gap length G which is located on the trailing side, and only the recording signal from the correct magnetic gap continues to be written into the recording medium D.

Therefore, as shown in FIG. 3, in the lower core layer 1 which corresponds to a core on the leading side, even if the first magnetic material layer 7, the nonmagnetic material layer 8, and the second magnetic material layer 9 are formed in parallel, and the nonmagnetic material layer 8 is exposed between the first magnetic material layer 7 and the second magnetic material layer 9 at the surface facing the recording medium D, recording characteristics are not greatly affected.

On the contrary, if a secondary magnetic gap is formed in the upper core layer 6 which corresponds to a core on the trailing side, the recording signal written into the recording medium D by the leakage magnetic field from the correct magnetic gap is erased by the leakage magnetic field from a secondary magnetic gap formed in the upper core layer 6, and thus recording characteristics become unstable.

Therefore, with respect to the upper core layer 6 on the trailing side, as shown in FIGS. 1 through 3, the nonmagnetic material layer 8 must be exposed at the surface facing the recording medium D in contact with the gap layer 2 so that a magnetic gap having the gap length Gl is formed by the gap layer 2 and the nonmagnetic material layer 6.

Also, in the present invention, as shown in FIG. 4, the gap layer 2 formed on the lower core layer 1 may be omitted. In such a case, the nonmagnetic material layer 8 included in the upper core layer 6 is formed in contact with the lower core layer 1 in the tip region, a magnetic gap is formed by the nonmagnetic material layer 8 only.

Next, a method of fabricating the thin film magnetic head shown in FIG. 1 will be described with reference to FIGS. 5A through 5C and FIGS. 6A and 6B.

Figure 5A:
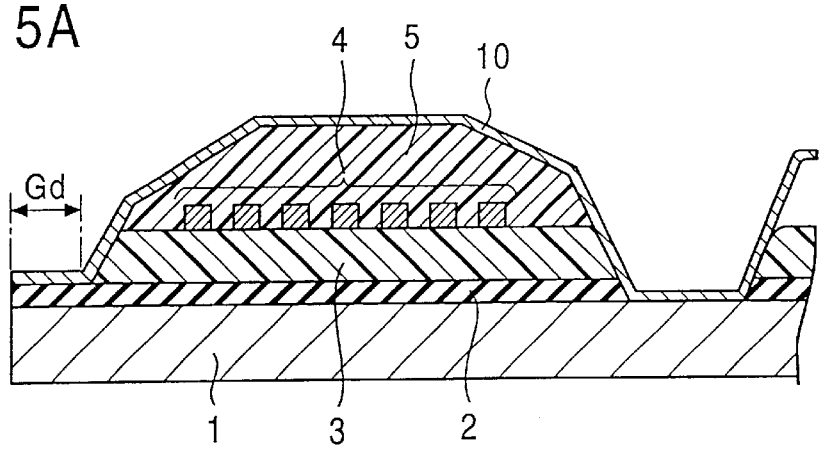
FIGS. 5A through 5C are longitudinal sectional views of a thin film magnetic head of the present invention, showing a half way of a method of fabricating the thin film magnetic head.

First, a gap layer 2 is formed on a lower core layer 1, and an insulating layer 3 is formed on the gap layer 2. As shown in FIG. 5A, the insulating layer 3 is not formed in the Gd section (magnetic gap formation section).

A coil layer 4 and an insulating layer 5 are sequentially formed on the gap layer 2.

As shown in FIG. 5A, an underlying layer 10 composed of a Ni-Fe alloy is formed to extend from the gap layer 2 in the Gd section to the insulating layer 5.

Figure 5B:
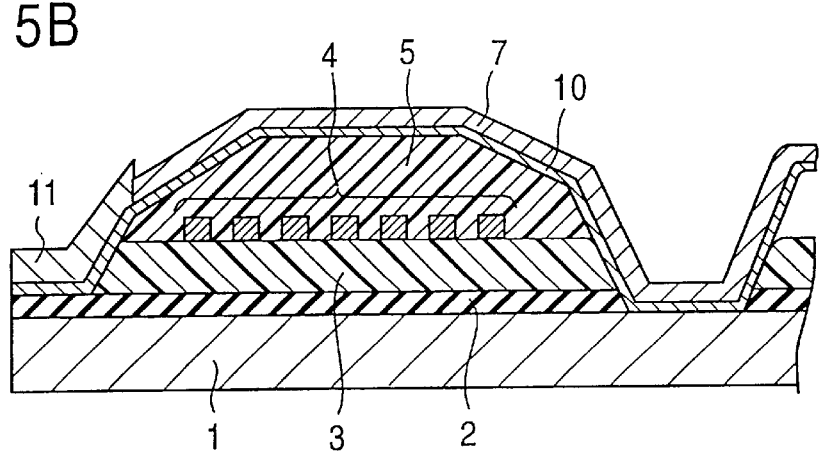

Next, as shown in FIG. 5B, a resist layer 11 is formed on the underlying layer 10 in the tip region, and a first magnetic material layer 7 composed of a Ni-Fe alloy is formed on the underlying layer 10 in the region other than the tip region.

Figure 5C:
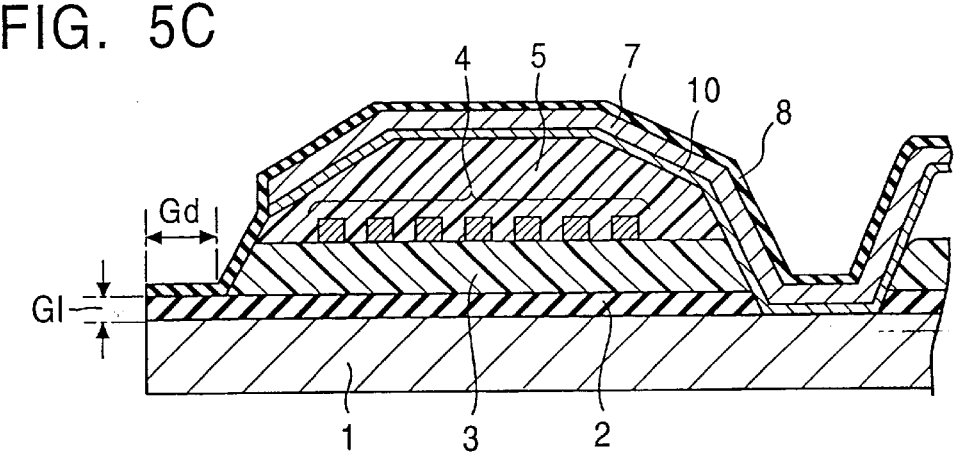

The resist layer 11 and the underlying layer 10 formed under the resist layer 11 are removed, and, as shown in FIG. 5C, a nonmagnetic material layer 8 is formed to extend from the gap layer 2 in the Gd section to the first magnetic material layer 7.

A gap length Gl is determined by the gap layer 2 and nonmagnetic material layer 8 that is in contact with the gap layer 2.

Figure 6A:
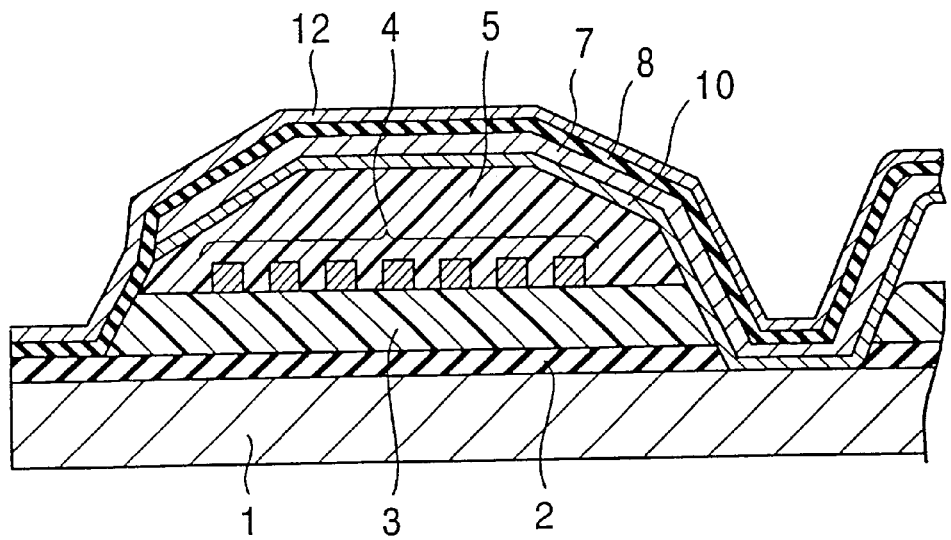
FIGS. 6A and 6B are longitudinal sectional views of the thin film magnetic head, showing the sequel to the method fabricating the thin film magnetic head shown in FIGS. 5A through 5C.
Figure 6B:
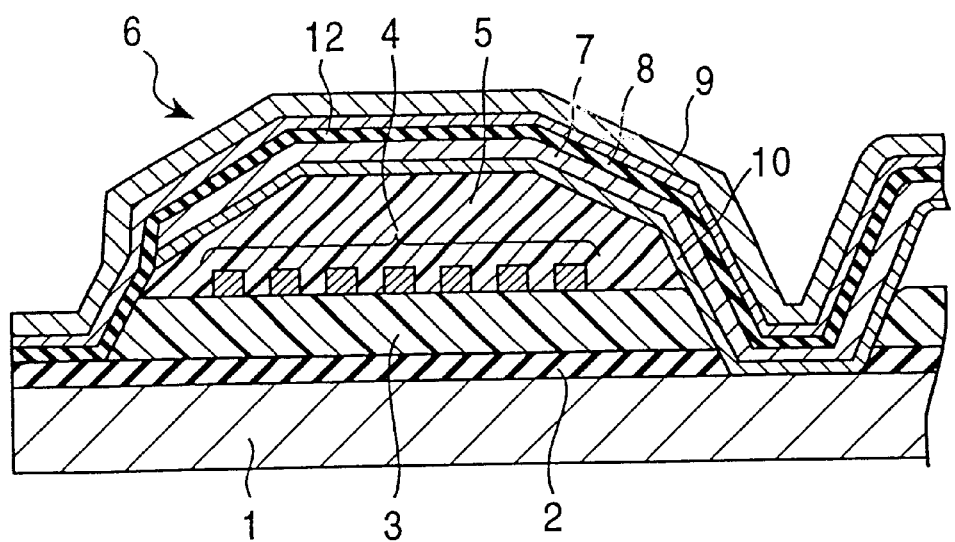

Next, as shown in FIG. 6A, an underlying layer 12 composed of a Ni-Fe alloy is formed on the nonmagnetic material Layer 8, and, as shown in FIG. 6B, a second magnetic material layer 9 composed of a Ni-Fe alloy is formed on the underlying layer 12. Thereby, an upper core layer 6 is obtained, which is a laminate including the nonmagnetic material layer 8 interposed between the first magnetic material layer 7 and the second magnetic material layer 9, and in which no secondary gap is formed at the surface facing a recording medium D.

When a lower core layer 1 is formed as a simple laminate, that is, a first magnetic material layer, a nonmagnetic material layer, and a second magnetic material layer are formed in parallel, the lower core layer 1 can be formed in a manner similar to that in the fabrication method of the upper core layer 6 described above.

Additionally, in the present invention, the gap layer 2 may be omitted in the lower core layer 1. In such a case, the gap length Gl of a magnetic gap is determined only by the thickness of the nonmagnetic material layer 8 included in the upper core layer 6.

Furthermore, in the present invention, the nonmagnetic material layer 8 may be formed by anodic oxidation. In order to form the nonmagnetic material layer 8 by anodic oxidation, in the step shown in FIG. 5C, a nonmagnetic metal layer composed of, for example, Al, Ta, or Cr, is formed to extend from the gap layer 2 in the Gd section to the first magnetic material layer 7.

The nonmagnetic metal layer is transformed into a nonmagnetic material layer (anodic oxidation layer) 8 by anodic oxidation.

The formation of the nonmagnetic material layer 8 by anodic oxidation can further increase insulating properties.

This is because of the fact that, by anodizing the nonmagnetic metal layer, the volume of the nonmagnetic material layer (anodic oxidation layer) 8 becomes greater than that of the nonmagnetic metal layer owing to the inclusion of oxygen.

Therefore, even if there are pin holes in the nonmagnetic metal layer, the pin holes are buried by anodizing the nonmagnetic metal layer, or even if there is dust on the surface for forming the nonmagnetic metal layer, the dust is buried under the nonmagnetic material layer (anodic oxidation layer) 8 by anodizing the nonmagnetic metal layer, and thus satisfactory insulating properties can be maintained.

Additionally, in order to further increase insulating properties, the nonmagnetic material layer 8 may have a multilayered structure.

When the nonmagnetic material layer 8 has a two-layered structure, preferably, an upper nonmagnetic material layer is formed by anodic oxidation. When the upper nonmagnetic material layer is formed by anodic oxidation, even if pin holes are formed in the lower nonmagnetic material layer, the pinholes can be properly buried, and thus insulating characteristics can be improved.

As described above, in accordance with the present invention, the upper core layer 6 is formed as a laminate in which the nonmagnetic material layer 8 is interposed between magnetic material layers 7 and 9, and, in particular, the nonmagnetic material layer 8 is exposed at the surface facing the recording medium D, being in contact with the gap layer 2, and thus no secondary magnetic gap is formed, enabling a reduction in eddy current loss at high frequencies.

Also, in accordance with the present invention, by forming the lower core layer 1 as a laminate including the nonmagnetic material layer interposed between magnetic material layers, eddy current loss can be reduced also in the lower core layer 1 in addition to in the upper core layer 6, enabling an improvement in recording characteristics.

Also, in accordance with the present invention, by forming the nonmagnetic material layer 8 by anodic oxidation, insulating properties are improved, and magnetic material layers 7 and 9 are electrically isolated from each other more properly, and thus eddy current loss can be effectively reduced.

In accordance with the present invention, as described above in detail, since at least one of a first core layer and a second core layer is formed as a laminate including a nonmagnetic material layer interposed between magnetic material layers, and the nonmagnetic material layer is exposed between the first and second core layers at the surface facing a recording medium, no secondary magnetic gap is formed, and thus eddy current loss can be reduced.

In particular, preferably, the core layer on the trailing side is formed as the laminate described above in order to obtain stable recording characteristics.

Also, when a nonmagnetic material layer is formed by anodic oxidation, insulating properties can be improved, and magnetic material layers can be electrically isolated from each other properly, enabling further reduction in eddy current loss.

What is claimed is:

1. A method for fabricating a thin film magnetic head, said thin film magnetic head comprising a lower magnetic core layer, an upper magnetic core layer, a nonmagnetic gap layer provided between said lower and upper magnetic core layers, a coil layer for inducing a recording magnetic field in said lower and upper magnetic core layers, and a second insulating layer covering said coil layer, said method comprising the steps of:

forming said nonmagnetic gap layer on said lower magnetic core layer;

forming a first insulating layer on a first part of said nonmagnetic gap layer, a second part of the nonmagnetic gap layer not covered with the first insulating layer is a magnetic gap formation section, which is part of a tip region;

forming said coil layer and said second insulating layer on said first insulating layer;

forming a first underlying layer composed of a magnetic material extending from said nonmagnetic gap layer inside the tip region over said second insulating layer;

forming a first magnetic material layer on said first underlying layer outside the tip region;

removing said first underlying layer inside the tip region;

forming a nonmagnetic material layer extending from the nonmagnetic gap layer inside the tip region over said first magnetic material layer;

forming a second underlying layer composed of a magnetic material on said nonmagnetic material layer; and forming a second magnetic material layer on said second underlying layer.

2. The method of fabricating the thin film magnetic head according to claim 1, wherein said step of forming said nonmagnetic material layer further comprises:

forming a nonmagnetic metal layer extending from said nonmagnetic gap layer inside the tip region over said first magnetic material layer, wherein forming the nonmagnetic metal layer comprises oxidizing the nonmagnetic metal layer.

3. The method of fabricating the thin film magnetic head according to claim 1, wherein a magnetic gap is formed by interposing said nonmagnetic material layer between the first magnetic material layer and the second magnetic material layer in the tip region, instead of forming said gap layer between said lower core layer and said upper core layer.

4. The method of fabricating the thin film magnetic head according to claim 2, wherein-a magnetic gap is formed by interposing said nonmagnetic material layer between the first magnetic material layer and the second magnetic material layer in the tip region, instead of forming said gap layer between said lower core layer and said upper core layer.

* * * * *

UNITED STATES PATENT AND TRADEMARK OFFICE
CERTIFICATE OF CORRECTION

PATENT NO.   : 6,604,274 B1
DATED        : August 12, 2003
INVENTOR(S)  : Kiyoshi Sato It is certified that error appears in the above-identified patent and that said Letters Patent is hereby corrected as shown below:

<u>Column 10,</u>
Line 43, delete "wherein-a" and substitute -- wherein a -- in its place.

Signed and Sealed this

Thirtieth Day of December, 2003

JAMES E. ROGAN
*Director of the United States Patent and Trademark Office*